United States Patent Office 3,377,233
Patented Apr. 9, 1968

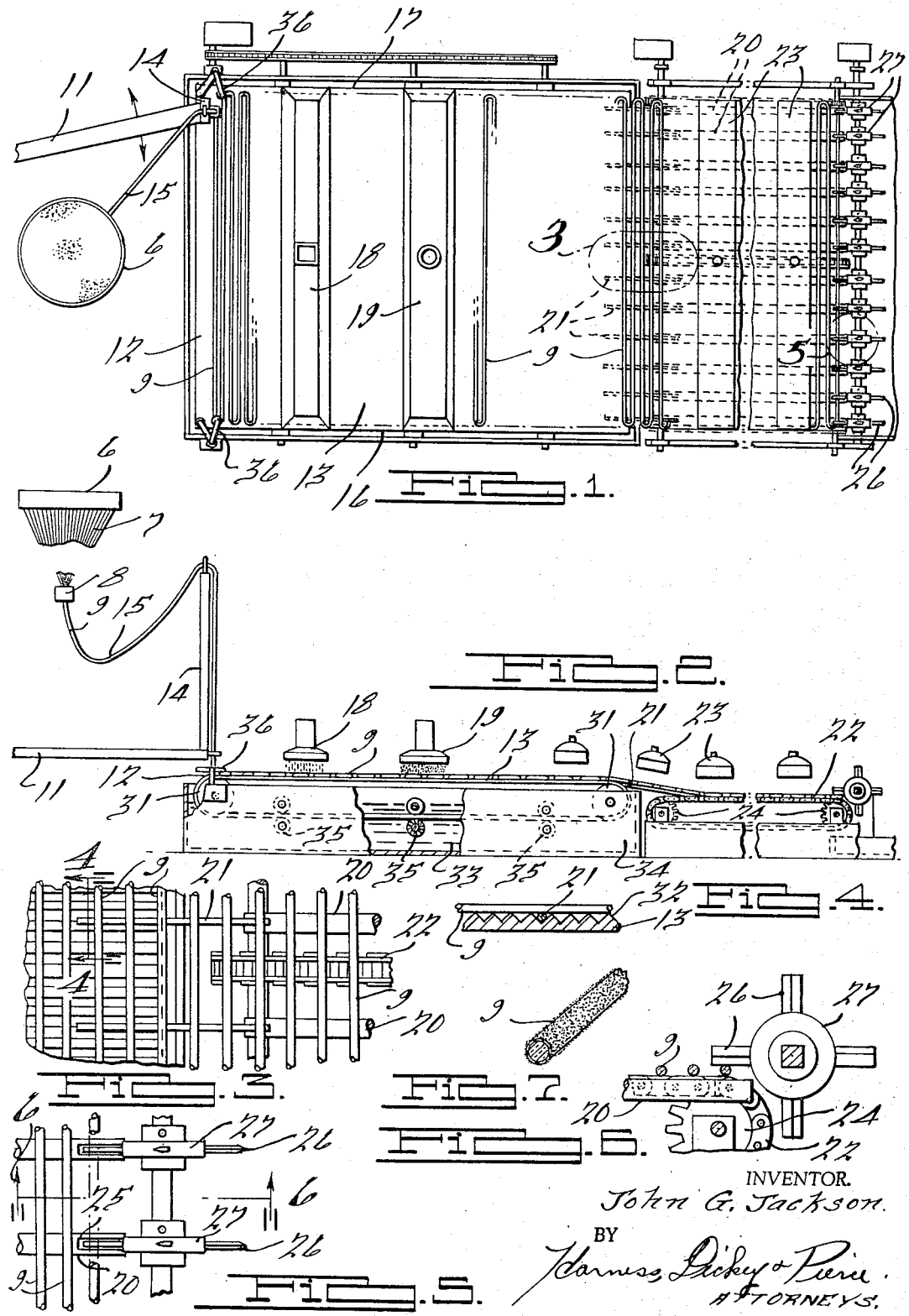

3,377,233
COATED GLASS THREAD
John G. Jackson, 31265 Woodside Drive,
Franklin, Mich. 48025
Filed Apr. 8, 1964, Ser. No. 358,291
13 Claims. (Cl. 161—174)

ABSTRACT OF THE DISCLOSURE

A coated glass thread, suitable for use as a reinforcing element in cementitious mixtures, comprising a glass thread composed of a plurality of fine glass filaments, a protective resin coating applied to the surface of the thread, and inorganic particles secured by the coating material to form a surface layer on the thread.

---

Difficulty has been experienced heretofore when attempting to mix short lengths of glass thread in a cement, plaster, or like mixture, and while maintaining the threads uniformly distributed within the material when being mixtured and poured. For example, when short threads of glass fibers are placed within a concrete mixture in which materials are being mixed, the glass threads when untreated, or when coated with a protective resin, will move out of the mixture rather than be absorbed thereinto and will collect in groups and be rolled into balls. The conventionally coated short fibers become limp when wet, especially in mixes with a high water-cement ratio. These fibers become wrapped around mixer paddles, pump vanes, screens, reinforcing steel and "ball-up" as mentioned above. A fiber coated according to the present invention will be relatively stiff and won't intertwine with each other and will have spacing properties.

In practicing the present invention, the glass thread, after being coated with a suitable resin, has a coating of fine material which is compatible with that of the mixture, cement, sand and the like, so that when the threads are cut into short lengths each of the lengths will function as a particle of sand, cement or the like, and will be compatible with the same material which is present in the mix. This permits an even distribution of the threads throughout the mix and the segregating and the balling of the threads is thereby entirely eliminated. The cement, sand and other particles applied to the thread are preferably small and capable of passing through a fine mesh screen so as to be dusted upon the thin film of protective resin material which acts as a binder for the dust particles which completely covers the surface of thread. The surface particles bond the thread with the other elements of the mixture thereby functioning as grains of sand which can be used in a cementitious slurry since they will readily permeate evenly throughout the mixture.

Accordingly, the main objects of the invention are: to coat a surface on a glass thread which is compatible with the material in which the thread is to be mixed; to protect a glass thread with a resin layer which forms a bond for a surface of fine particles which are compatible with the material in which the thread is to be mixed; to treat a thread formed from a large number of glass filaments with a resin to protect the surface and form a bond for particles which are compatible with materials of a mix in which lengths of the glass threads are to be embedded, and in general to provide lengths of glass threads which are rigid, have a protective coating thereon and a compatible surface retained by said coating providing increased resistance to an environment of high alkalinity and/or elevated temperature.

Other objects and features of novelty of the invention will be specifically pointed out or will become apparent when referring, for a better understanding of the invention, to the following description taken in conjunction with the accompanying drawing, wherein:

FIG. 1 is a plan view of a device for producing short lengths of coated glass threads embodying the present invention;

FIG. 2 is a view in elevation of the structure illustrated in FIG. 1;

FIG. 3 is an enlarged broken view of the structure illustrated in FIG. 1 as viewed within the area 3 thereof;

FIG. 4 is a broken sectional view of the structure illustrated in FIG. 3 taken on the line 4—4 thereof;

FIG. 5 is an enlarged broken view of the structure illustrated in FIG. 1, as viewed within the area 5 thereof;

FIG. 6 is a sectional view of the structure illustrated in FIG. 5, taken on the line 6—6 thereof; and FIG. 7 is a perspective view of a length of the coated glass thread.

In FIGS. 1 and 2, a device is illustrated for producing, processing and severing a glass thread into sections of predetermined lengths. The device 6 receives hot glass from which filaments 7 are drawn and accumulated at 8 into a thread 9 containing a large number of fine glass filaments 7. In a standard type of device 6, as many as 204 filaments are drawn simultaneously and formed into a slightly twisted thread 9 of a diameter conforming to a thread designated by the number 50. The filaments from the device 6 may be treated with a substance before being formed into the thread 9 to act as a lubricant to prevent abrasion between the filaments when the thread is flexed. Such a material may or may not be employed when producing the present thread since it will not be flexed after further treatment and during the use thereof.

A swinging arm or carriage 11 moves the thread back and forth along the forward edge 12 of a corrugated belt conveyor 13 which is preferably of substantial width since the thread is produced at a rapid speed. If, for example, the glass thread should be produced at the rate of 5000 feet a minute and the width of the belt 13 is such as to take a 25 foot length of the thread and if the thread is laid 10 to the inch, the speed of the belt must therefore be 20 inches per minute. An arm 14 on the swinging arm 11 guides the thread 9 thereover as a loop 15 provides extra material which may be drawn on near the ends of a stroke of the arm 11. The lengths of thread from the edge 16 to the edge 17 on the belt 13 are advanced past a station 18 at which a resin material is sprayed, fogged or otherwise applied to the length of threads as they are advanced therebeneath. Such a resin would be one which sets to a hard infusable mass such as the thermosetting groups known as epoxies and polyesters. These form a permanent bond with concrete and will rapidly become set upon the application of heat. The threads are advanced by the belt under a dusting device 19 where very fine particles are applied to the resin of the thread while in the wet or tacky stage which forms a bond for the particles. The particles embody the same substance as those commonly mixed with concrete which includes powdered silica sand, granite, marble and other rock materials which are insoluble in water, including light aggregates such as Perlite and Zonolite. A dry cement such as portland, lime, magnetite, gypsum and the like may be employed alone or in combination with the insoluble materials. The hard surface particles produce a mechanical bond the same as a grain of sand while the cement material products a chemical bond.

The coated threads are advanced by the belt 13 onto the wire fingers 21 and a plurality of conveyor chains 22 and spaced rods 20 provided therebetween. The rods 20 are spaced apart a fraction of an inch depending upon the length of the thread to be employed in the mixture. The speed of the chains 22 will be the same as that of belt 13 and will be of a length sufficient to have the resin dried upon the application of heat either in an oven or by a plurality of infra-red lamps 23. Between the sprockets 24 at the advanced end of the chains 22 a slot 25 is provided in the ends of the rods 20 through which blades 26 on rotating discs 27 pass to sever the threads into desired lengths. The belt 13 is driven over rollers 31 with the corrugated outer face having pointed lands 32 disposed lengthwise thereof. The pointed lands support the lengths of threads at spaced points so that the greater part of the thread surface will be treated with the resin and particles. The wire fingers 21 in some of the grooves between the lands strip the thread lengths from the belt by the advancement of the belt. The bottom portion of the belt conveyor enters a solution 33 in a tank 34 where the lands 32 are cleaned by rotating brushes 35 of the resin and dust particles collected from the devices 18 and 19. The lands 32 on the belt are preferably made from a low friction resin, such as seran, Teflon, and the like to which resins are substantially non-bondable.

Swinging arms 36 are employed at the side end 16 and 17 of the belt 13 at the end 12 thereof. The arms 36 are moved down by the arm 11 when passed thereover to engage the thread and hold it as the arm 11 moves back to the other side of the belt. The advancement of the belt 13 and arm 36 releases the arm which swings back to thread-engaging position before the arm 11 returns with another length of thread. The infra-red lamps 23 are applied by the area occupied by the wires 21 and rods 20 and may be applied at the end of the belt 13 provided it does not harden the resin enough to prevent it from being removed by the brushes 35 and solution 33. The length of thread after being dried abut the discs 27 at the end of the rods 20 where they are severed into small lengths as the discs 27 are rotated.

Each length, as illustrated in FIG. 7, has a protective coating of resin which prevents the alkaline material of the mixture from eroding the glass filament during the drying thereof. The surface coating of the particles likens each of the thread lengths to a solid element which is compatible in the cement or other mixture.

Heretofore, the length of the glass thread with the resin coating thereon was found to be incompatible with the different cement mixtures and would be ejected therefrom during the mixing operation.

The present type of thread lengths with the hard material coated thereon functions as an element of the mixture and is retained therein and not ejected thereby. The material on the surface is fine, preferably of a size to pass through a 300 mesh screen so as to have the entire surface substantially solidly covered with the dust-like particles. The materials may vary depending upon the type of concrete or other substance being mixed, whether in dry or slurry form, so that the lengths of the coated glass threads will be compatible with the specific mixture in which it is incorporated. Thus the rock or sand material may be a silicate, marble, quartz and the like and may be perlite, hardtite and other known light materials when the mixture is of the insulating type. As pointed out above, a certain amount of cement dust may be incorporated in the dust insoluble particles so as to have each of the lengths of glass thread produce a mechanical as well as a chemical bond with other materials of the mixture. The term resin herein employed is to be construed as not only the thermosetting type such as the polyesters and epoxies but also any material suitable for coating which sets to a hard infusable mass, such as porcelain, enamels and ceramics.

What is claimed is:

1. A length of thread embodying a plurality of glass filaments, a coating on said thread which protects the filaments and functions as a bonding material, and inorganic particles which form a surface layer on the thread secured thereto by said bonding material.

2. A thread made from a plurality of fine glass filaments, a protective bonding material on the surface of the thread, and inorganic particles bonded to the thread by said material to form a surface layer of said particles.

3. A thread made from a plurality of fine glass filaments, a protective bonding material on the surface of the thread, and inorganic particles bonded to the thread by said bonding material to form a surface layer of said particles to have each thread function as a grain of said particle material when the thread is severed into lengths.

4. The method of producing a reinforcing element which includes the steps of forming a thread from a plurality of glass filaments, coating the surface of the thread with a protective bonding material applying fine inorganic particles to the coating material to form a surface layer, heating said coated thread to cure said material and severing the coated thread into predetermined lengths.

5. In an element having a central core formed of a plurality of glass filaments having substantial tension strength, a bonding material on the surface of said core which stiffens the core when the material is set, and inorganic particles bonded by said material to the surface of the core to form a continuous layer.

6. In an element having a central core formed of a plurality of glass filaments having substantial tension strength, a resin on the surface of said core which stiffens the core when the resin is set, and inorganic particles bonded by said resin on the surface of the core to form a continuous layer, said particles being insoluble in water.

7. In an element having a central core formed of a plurality of glass filaments having substantial tension strength, a resin on the surface of said core which stiffens the core when the resin is set, inorganic particles bonded by said resin on the surface of the core to form a continuous layer, said particles being insoluble in water, and having particles of cement mixed therewith.

8. In an element having a central core formed of a plurality of glass filaments having substantial tension strength, a resin on the surface of said core which stiffens the core when the resin is set, and inorganic particles bonded by said resin on the surface of the core to form a continuous layer, the majority of said particles being of a size to pass through a 300 mesh screen.

9. In an element having a central core formed of a plurality of glass filaments having substantial tension strength, a resin on the surface of said core which stiffens the core when the resin is set, and inorganic particles bonded by said resin on the surface of the core to form a continuous layer, the majority of said particles being of a size to pass through a 300 mesh screen, and said elements being of a length between ¼ and 1 inch.

10. In an element having a central core of substantial tension strength, a resin on the surface of said core which stiffens the core when the resin is set, and inorganic particles bonded by said resin on the surface of the core to form a continuous layer, said core being a thread containing a large number of glass filaments.

11. In an element having a central core of substantial tension strength, a resin on the surface of said core which stiffens the core when the resin is set, and inorganic particles bonded by said resin on the surface of the core to form a continuous layer, said core being a thread containing a large number of glass filaments, said particles being a fine dust of inorganic material.

12. In an element having a central core of substantial tension strength, a resin on the surface of said core which stiffens the core when the resin is set, and inorganic particles bonded by said resin on the surface of the core to form a continuous layer, said core being a thread containing a large number of glass filaments, and said resin being a fast setting epoxy.

13. A glass thread made from a number of fine glass filaments to be substantially flexible and a coating on said thread which retains the thread and lengths thereof stiff in the presence of water in a mix and which protects the glass filaments against attack by an alkaline material in a solution, and fine particles of inorganic material covering the peripheral surface of said coating and bonded thereto.

References Cited

UNITED STATES PATENTS

| | | | |
|---|---|---|---|
| 2,215,150 | 9/1940 | Clemens | 161—175 |
| 2,738,285 | 3/1956 | Biefeld et al. | 106—99 |
| 2,793,130 | 5/1957 | Shannon | 106—99 |
| 2,799,598 | 7/1957 | Biefeld et al. | 156—167 |

ROBERT F. BURNETT, *Primary Examiner.*

ALEXANDER, WYMAN, *Examiner.*

R. A. FLORES, *Assistant Examiner.*